United States Patent [19]

Caldwell

[11] Patent Number: 4,557,069

[45] Date of Patent: Dec. 10, 1985

[54] INSECT TRAP ARRANGEMENT, KIT THEREFOR AND METHOD OF MAKING THE SAME

[75] Inventor: Edward N. Caldwell, Knoxville, Tenn.

[73] Assignee: Dalen Products, Inc., Knoxville, Tenn.

[21] Appl. No.: 561,283

[22] Filed: Dec. 14, 1983

[51] Int. Cl.[4] .............................................. A01M 1/10
[52] U.S. Cl. ...................................... 43/122; 43/107
[58] Field of Search ................. 43/107, 114, 115, 116, 43/117, 121, 122

[56] References Cited

U.S. PATENT DOCUMENTS

| | | | |
|---|---|---|---|
| 1,783,631 | 2/1930 | Sladky | 43/107 |
| 1,787,421 | 12/1930 | Ruddell | 43/107 |
| 1,971,367 | 8/1934 | Brooke | 43/122 |
| 2,020,283 | 11/1935 | Armstrong et al. | 43/107 |
| 2,162,502 | 6/1939 | Goulard | 43/107 |
| 2,193,492 | 3/1940 | Richardson | 43/107 |
| 3,708,908 | 1/1973 | Levey | 43/122 |
| 4,411,094 | 10/1983 | Spackova et al. | 43/121 |
| 4,505,065 | 3/1985 | Niemeyer | 43/122 |

Primary Examiner—Nicholas P. Godici
Assistant Examiner—M. Jordan
Attorney, Agent, or Firm—Candor, Candor & Tassone

[57] ABSTRACT

An insect trap arrangement, kit therefor and method of making the same are provided, the trap arrangement comprising a lure unit for attracting insects thereto and causing the attracted insects to fall by gravity therefrom, an insect storage container having an inlet for receiving the falling insects therethrough whereby the storage container is adapted to store the falling insects therein, and a conveying unit disposed intermediate the lure unit and the storage container and having an inlet operatively associated with the lure unit to receive the falling insects therefrom and having an outlet operatively associated with the inlet of the storage container for discharging by gravity the falling insects from the conveying unit into the inlet of the storage container. The conveying unit has structure defining a plurality of spaced apart air breaks between the lure unit and the inlet of the storage container to vent the rising odor of the insects in the storage container to the atmosphere so that the vented odor will substantially dissipate in the atmosphere before reaching the lure unit.

4 Claims, 11 Drawing Figures

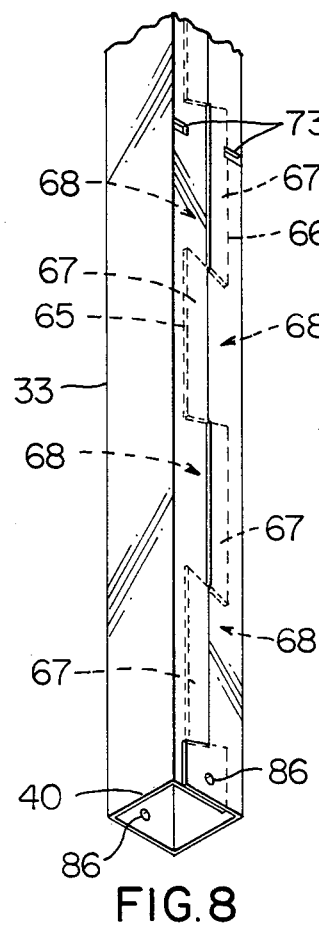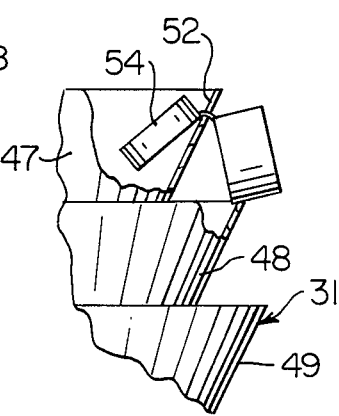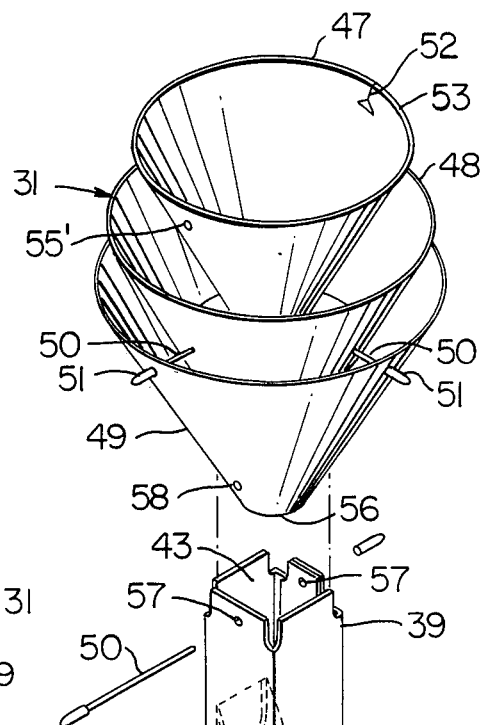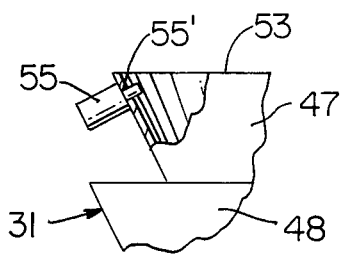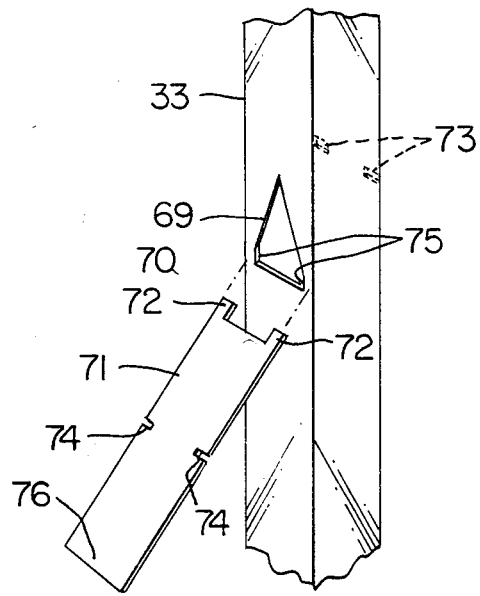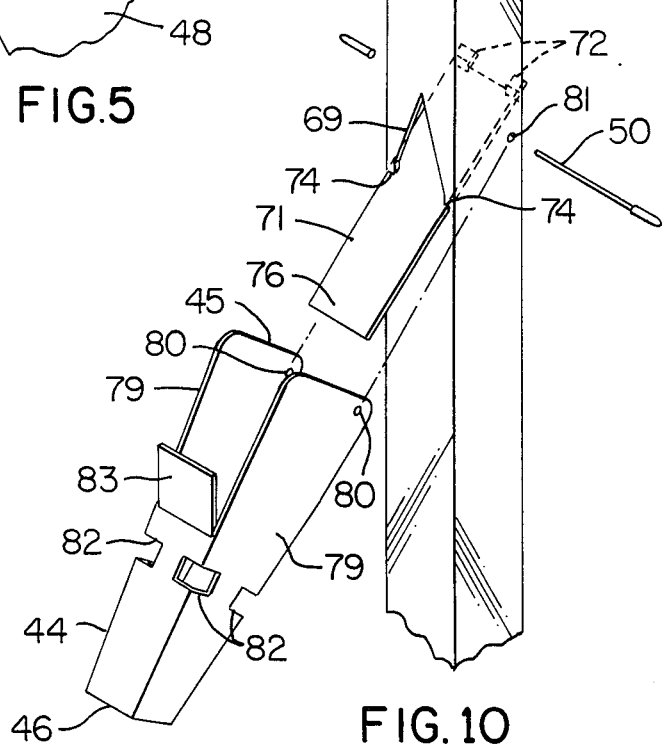

INSECT TRAP ARRANGEMENT, KIT THEREFOR AND METHOD OF MAKING THE SAME

BACKGROUND OF THE INVENTION

1. Field of the Invention

This invention relates to an improved insect trap arrangement and method of making the same as well as to an improved kit for making such an insect trap arrangement.

2. Prior Art Statement

It is known to provide an insect trap arrangement comprising a lure unit for attracting insects thereto and causing the attracted insects to fall by gravity therefrom, an insect storage container means having an inlet means for receiving the falling insects therethrough whereby the storage container means is adapted to store the falling insects therein, and a conveying means disposed intermediate the lure unit and the storage container means and having an inlet means operatively associated with the lure unit to receive the falling insects therefrom and having an outlet means operatively associated with the inlet means of the storage container means for discharging by gravity the falling insects from the conveying means into the inlet means of the storage container means. For example, see the U.S. Pat. No. 1,971,367 to Brooke,; the U.S. Pat. No. 2,020,283 to Armstrong et al; the U.S. Pat. No. 2,162,502 to Goulard; and the prior art structure illustrated in FIG. 1 of this application.

SUMMARY OF THE INVENTION

It is one feature of this application to provide an improved insect trap arrangement which has storage means for storing the trapped insects.

In particular, it was found according to the teachings of this invention that prior known insect trap arrangements must have the storage container means thereof emptied relatively often because the very strong and unpleasant odor of the decaying insects in the storage container means rises and overcomes the attracting scent in the lure unit thereof.

However, it was found according to the teachings of this invention that a plurality of air breaks can be provided in the trap arrangement to prevent the odor of the decaying insects in the storage container means from intermingling with the attracting odor in the lure unit to thereby reduce the number of times a person must accomplish the most disagreeable task of disposing of the foul smelling insects from an almost daily basis for the prior known structures to approximately only once every two to four weeks for the insect trap arrangement of this invention.

For example, one embodiment of this invention provides an insect trap arrangement comprising a lure unit for attracting insects thereto and causing the attracted insects to fall by gravity therefrom, an insect storage container means having an inlet means for receiving the falling insects therethrough whereby the storage container means is adapted to store the falling insects therein, and a conveying means disposed intermediate the lure unit and the storage container means and having an inlet means operatively associated with the lure unit to receive the falling insects therefrom and having an outlet means operatively associated with the inlet means of the storage container means for discharging by gravity the falling insects from the conveying means into the inlet means of the storage container means. The conveying means has means defining a plurality of spaced apart air break means between the lure unit and the inlet means of the storage container means to vent the rising odor of the insects in the storage container means to the atmosphere so that the vented odor will substantially dissipate in the atmosphere before reaching the lure unit.

Accordingly, it is an object of this invention to provide an improved insect trap arrangement having one or more of the novel features of this invention as set forth above or hereinafter shown or described.

Another object of this invention is to provide an improved method of making such an insect trap arrangement, the method of this invention having one or more of the novel features of this invention as set forth above or hereinafter shown or described.

Another object of this invention is to provide an improved kit for making such an insect trap arrangement, the kit of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is an enlarged, fragmentary view taken on line 4—4 of FIG. 2 and being partially in cross-section.

FIG. 5 is an enlarged fragmentary view taken on line 5—5 of FIG. 2 and being partially in cross-section.

FIG. 8 is an enlarged, fragmentary bottom perspective view of a tubular member that has been formed from the blank of material of FIG. 7.

FIG. 9 is a fragmentary perspective view of the tubular member of FIG. 8 together with a part that is to be assembled thereto.

FIG. 10 is an enlarged, fragmentary exploded perspective view illustrating various parts of the insect trap arrangement of FIG. 2.

DESCRIPTION OF THE PREFERRED EMBODIMENTS

Figure 1:
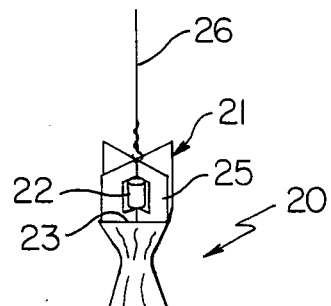
FIG. 1 is a front view of a prior art insect trap arrangement.

While the various features of this invention are hereinafter illustrated and described as being particularly adapted to provide an insect trap arrangement for Japanese beetles, it is to be understood that the various features of this invention can be used singly or in various combinations thereof to provide an insect trap arrangement for other types of insects as desired.

Therefore, this invention is not to be limited to only the embodiments illustrated in the drawings, because
} the drawings are merely utilized to illustrate one of the wide variety of uses of this invention.

Referring now to FIG. 1, a prior art insect trap arrangement is generally indicated by the reference numeral 20 and comprises a lure unit 21 having a lure device 22 carried thereby for attracting insects thereto by the odor issuing from the lure device 22 whereby the attracted insects fall into the inlet 23 of a storage container means 24 suspended from baffle means 25 of the lure unit 21, the baffle means 25 comprising a conveying means that causes the insects to be directed into the storage container means 24 in a manner well known in the art. For example, see the aforementioned U.S. Pat. No. 1,971,367 to Brooke; the U.S. Pat. No. 2,020,283 to Armstrong et al and the U.S. Pat. No. 2,162,502 to Goulard, whereby these three U.S. patents are being incorporated into this disclosure by this reference thereto.

The insect trap arrangement 20 of FIG. 1 is suspended from a supporting structure, such as a tree or the like, by a wire hanger 26 and, as previously described, the container means 24 needs to be emptied on almost a daily basis because the odor of the decaying insects trapped in the storage container means 24 rises and passes out of the inlet 23 thereof to intermingle with the odor of the lure device 22 to cancel the attracting odor and thereby render the insect trap arrangement 20 relatively useless until the decaying insects are removed from the storage container means 24. While the container means 24 illustrated in FIG. 1 comprises a relatively small plastic bag or the like of approximately only one or two quart size, it is to be understood that the same sometimes comprises a metallic container, such as a tin can or the like.

Also, while the particular insect trap arrangement 20 of FIG. 1 does not provide a funnel means for defining a conveying means between the lure unit 21 and the inlet 23 of the storage container means 24, the three aforementioned U.S. patents disclose such a funnel conveying means between the lure unit and the storage container means.

As previously stated, one of the features of this invention is to provide an insect trap arrangement that will tend to prevent the odor of the decaying insects in the storage container means from intermingling with the odor means of the lure device so that the storage container means of the insect trap arrangement need not be emptied as often as the prior known storage container means.

In addition, another feature of this invention is to provide an insect trap arrangement wherein the storage container means is adapted to be disposed on a supporting structure, such as the ground or the like, and thereby can comprise a relatively large storage container means so that the same can contain a large quantity of trapped insects which further reduces the number of times the storage container means of the insect trap arrangement of this invention need be emptied as will be apparent hereinafter, as well as not harm the insect trap arrangement because of the large weight of the stored insects therein as would by the case if such a large storage container means is utilized with prior known arrangements, such as the insect trap arrangement 20 of FIG. 1.

Figure 2:
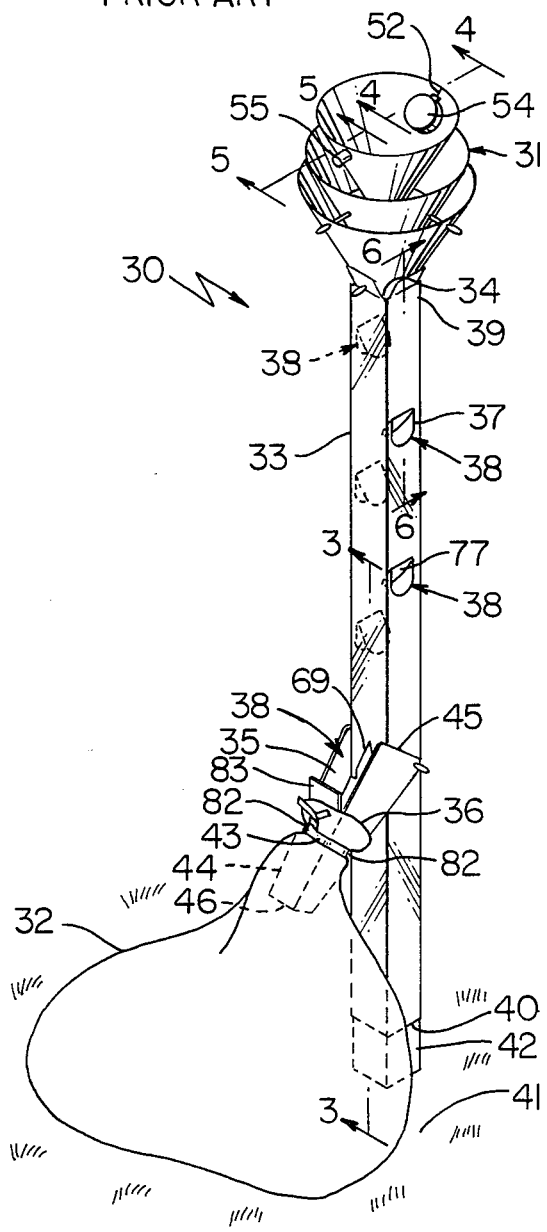
FIG. 2 is a perspective view of the insect trap arrangement of this invention.

For example, such an insect trap arrangement of this invention is generally indicated by the reference numeral 30 in FIG. 2 and comprises a lure unit 31, a storage container means 32, and a conveying means 33 disposed intermediate the lure unit 31 and the storage container means 32 and having an inlet means 34 operatively associated with the lure unit 31 to receive the falling insects therefrom and an outlet means 35 operatively associated with an inlet means 36 of the storage container means 32 for discharging by gravity the falling insects from the conveying means 33 into the inlet means 36 of the storage container means 32. The conveying means 33 has means 37 defining a plurality of spaced apart air break means 38 between the lure unit 31 and the inlet means 36 of the storage container means 32 to vent the rising odor of the insects in the storage container means 32 to the atmosphere so that the vented odor will substantially dissipate in the atmosphere before reaching the lure unit 31. In this manner, the odor of the decaying insects in the storage container means 32 does not intermingle with the attracting odor issuing from the lure unit to cancel its effect as in the prior known arrangements, such as in the insect trap arrangement 20 of FIG. 1.

The conveying means 33 of the insect trap arrangement 30 of this invention comprises a hollow tubular member formed of any suitable material, such as plastic material and having opposed open ends 39 and 40 with the end 39 thereof being adapted to support the lure unit 31 in a manner hereinafter described while the lower end 40 thereof is adapted to be supported on a supporting structure 41, such as the ground or the like, by a wooden support 42 in a manner hereinafter set forth.

The storage container means 32 of the insect trap arrangement 30 of this invention comprises a relatively large plastic bag or the like which is adapted to also be supported on the supporting structure 41 while the mouth or inlet 36 thereof is adapted to be secured to the outlet means 35 of the conveying means 33 by a conventional wire tie means 43 in a manner hereinafter set forth.

The outlet means 35 of the conveying means 33 comprises a chute means 44 formed of any suitable material, such as plastic material, and having one end 45 hinged to the tubular member 33 in a manner hereinafter set forth and an outer end 46 disposed within the inlet means 36 of the container storage means 32 and around which the wire tie means 43 holds the top or mouth 36 of the storage container means 32 in a manner hereinafter set forth.

The lure unit 31 of the insect trap arrangement 30 of this invention is best illustrated in FIGS. 2 and 10 and comprises three frusto-conical members 47, 48 and 49 partially telescoped together and being held in such an arrangement by a pair of pins or rods 50 respectively passing through the three members 47, 48 and 49 at right angles to each other and having suitable fastening tips 51 provided on the outer ends thereof to prevent the rods or pins 50 from being readily removed from their assembled condition. The frusto-conical members 47, 48 and 49 can be formed of any suitable material, such as plastic material, and can be suitably colored in a manner to be attractive to the desired insects, such as Japanese beetles.

The upper frusto-conical member 47 has a slot 52 in its outer edge 53 for supporting a floral lure device 54 as illustrated in FIG. 4 and has an opening 55' below the outer edge 53 thereof for receiving therein a sex lure device 55, the lure devices 54 and 55 being conventional in the art and being utilized for the purpose of issuing odor means that attract the insects thereto, such as Japanese beetles or the like. When the insects reach the lure unit 31, the frusto-conical members 47, 48 and 49 cause the attracted insects to fall by gravity out of the lower open end 56 of the bottom frusto-conical member 49 into the inlet means 34 of the conveying means 33 as the lower end 56 of the lure unit 31 is telescopically disposed in the open end 39 of the tubular member 33 and is fastened thereto by a rod or pin 50 passing through suitable openings 57 in the conveying means 33 and suitable openings 58 in the lure unit 31 whereby the lure unit 31 is supported on the conveying means 33 in the position illustrated in FIG. 2.

Figure 7:
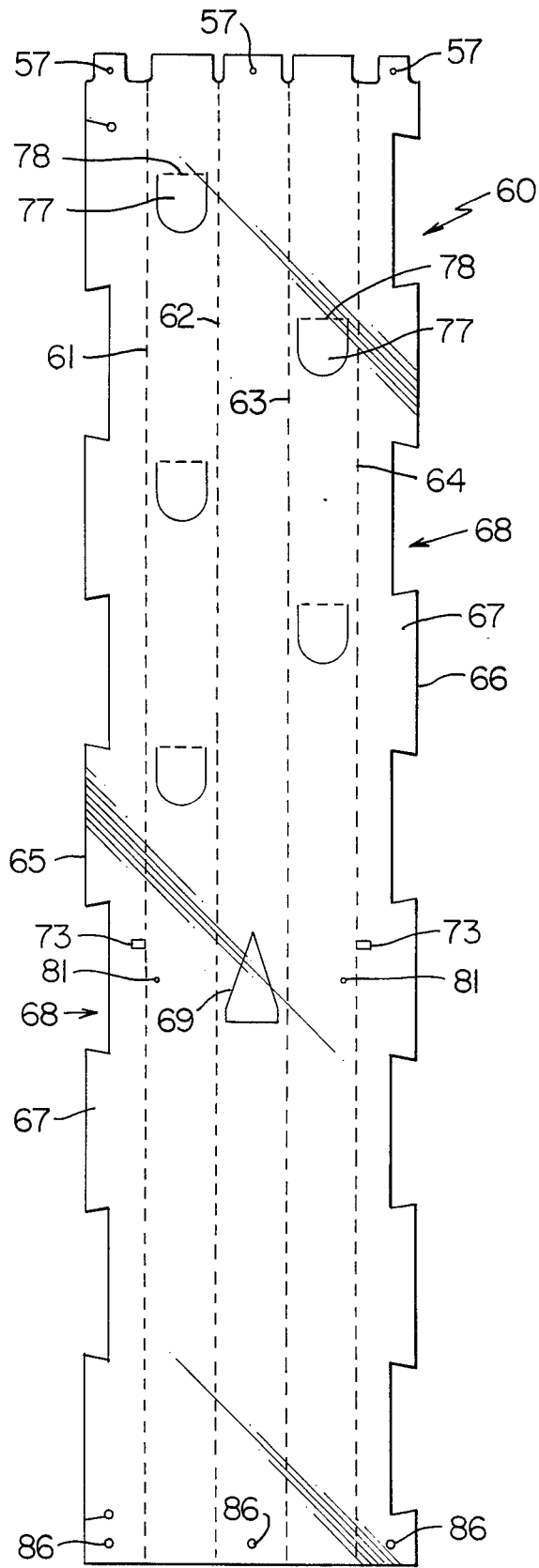
FIG. 7 is an enlarged, plan view of a blank of material for forming part of the insect trap arrangement of FIG. 2.

As previously stated, the conveying means 33 can be formed of any suitable material and in any suitable manner and in the embodiment illustrated in the drawings, the conveying means 33 is formed from a flat blank of material that is generally indicated by the reference numeral 60 in FIG. 7 which is suitably cut and scored to permit the blank 60 to be folded along fold lines 61, 62, 63 and 64 to form a tubular member that has a substantially rectangular cross-sectional construction as illustrated, the outer edges 65 and 66 of this blank 60 forming alternating tongue 67 and grooves 68 which intermesh together as illustrated in FIG. 8 to hold the folded blank 60 into the tubular structure illustrated in the drawings.

Figure 3:
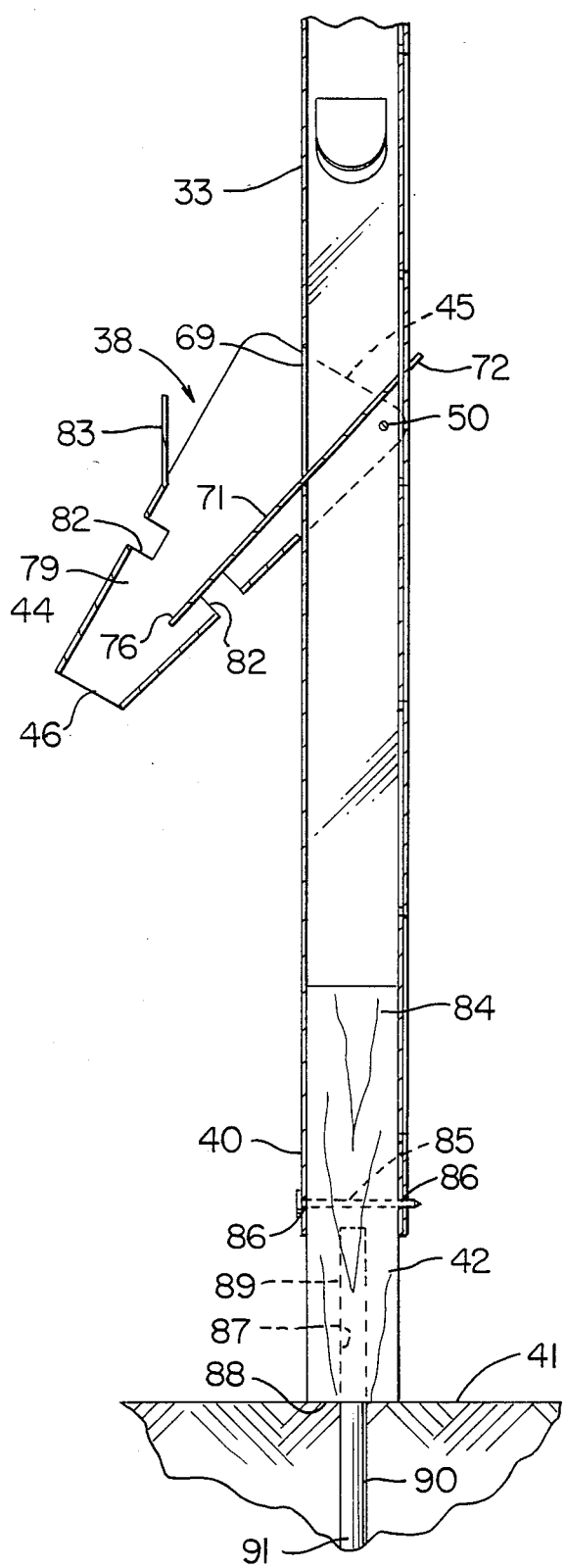
FIG. 3 is an enlarged, fragmentary cross-sectional view taken on line 3—3 of FIG. 2.

The blank 60 has a cutout 69 that defines a lower edge 70 against which a flat tab, platform or tongue 71 is adapted to rest and have rearwardly extending tabs 72 received in openings 73 formed in a rear wall of the conveying means 33 while side notches 74 of the tongue 71 receive adjacent edges 75 of the conveying means 33 therein to hold the tongue 71 in an angled downwardly direction as illustrated in FIGS. 3 and 10 and thereby cause the falling insects in the conveying means 33 to roll by gravity from within the conveying means 33 out through the cutout 69 to the lower end 76 of the tongue 71 and, thus, into the chute means 44 as illustrated.

Figure 6:
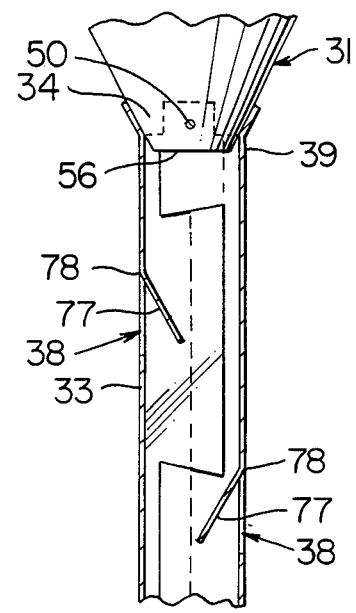
FIG. 6 is an enlarged, fragmentary cross-sectional view taken on line 6—6 of FIG. 2.

The blank 60 has tabs 77 carved therefrom and each is adapted to be folded on a fold line 78 so that the same is angled inwardly into the conveying means 33 as illustrated in FIG. 6 to deflect the rising odor of the decaying insects in the storage container means 32 outwardly through the resulting opening or air break means 38 formed in the side of the conveying means 33. Because the tabs 77 do not extend completely across the interior of the conveying means 33 and are angled downwardly, the falling insects in the conveying means 33 readily pass around the tabs 77 as they fall by gravity to the chute means 44.

The chute means 44 can be formed in any suitable configuration and of any suitable material, and in the embodiment illustrated in the drawings, the chute means 44 is formed from a blank of plastic material (not shown) folded into a funnel-like shape wherein a pair of spaced apart opposed sides 79 thereof are adapted to be hinged to the conveying means 33 by being disposed on the outside thereof and having a rod or pin 50 pass through aligned openings 80 in the sides 79 and cooperating aligned openings 81 in the conveying means 33 to be aligned with the tongue 71 so that the tongue 71 has its end 76 fully received in the chute means 44 as illustrated in FIG. 3.

The chute means 44 has aligned corner notches 82 formed therein whereby the open end 36 of the bag 32 can be pressed into the notches 82 by the wire tie means 43 to hold the open end 36 of the bag 32 thereto as illustrated in FIG. 2.

The chute means 44 has a top tab 83 which is adapted to be folded upwardly in the manner illustrated in FIG. 3 and thereby defines another air break means 38 that is adjacent to the tubular member of the conveying means 33 and thereby is intermediate the inlet means 36 of the storage container means 32 and the tubular member of the conveying means 33 to dissipate the rising odor of the insects in the storage container means 32 to the atmosphere.

The wooden support means 42 is shaped to have the upper end 84 received within the lower open end 40 of the conveying means 33 and be secured thereto by a nail or other fastening means 85 received through opening means 86 in the conveying means 33 and through the wooden block 42 as illustrated in FIG. 3 so that the conveying means 33 is fully supported on the wooden support 42.

The wooden support 42 has a central opening 87 formed in the lower end 88 thereof and receives an upper end 89 of a metal support rod 90 therein which is adapted to have its lower end 91 pushed into the ground 41 so as to hold the lower end 88 of the wooden support 42 against the ground 41 in the manner illustrated in FIG. 3 whereby the conveying means 33 is completely supported on the ground 41 in a free standing manner with the lure unit 31 being carried on top of the conveying means 33.

Accordingly, it can be seen that the insect trap arrangement 30 of this invention can be formed of a relatively few parts in a relatively simple manner and all of such parts can readily be provided in kit form wherein the user of the insect trap arrangement 30 would receive the conveying means 33 in the blank form illustrated in FIG. 7 as well as receive the lure unit 31 and chute means 43 in a disassembled or assembled condition together with the wooden support block 42, rod 91, pins 50, lure devices 54 and 55 and a supply of storage bags 32 whereby the user can readily erect the insect trap arrangement 30 from such a kit in a manner now to be described.

The user can assemble the frusto-conical members 47, 48 and 49 in the manner illustrated in FIG. 10 by utilizing the fastening rods or pins 50 and after erecting the flat blank of material 60 into the rectangular conveying means 33 in the manner previously described, secures the lure unit 31 to the upper end 39 thereof by a fastening pin 50. The user then inserts the tongue or platform 71 into the cutout 69 into the position illustrated in FIG. 10 and either erects the chute means 44 or takes the erected chute means 44 and hinges the same to the conveying means 33 by a pin 50. Thereafter, the user inserts the wooden block 42 into the open end 40 of the conveying means 33 and fastens the same thereto by the nail 85.

The user then takes the assembled conveying means 33 to the desired location and inserts the rod into the cavity 87 in the wooden block 42 and pushes the lower end 91 of the rod 90 into the ground 41 until the bottom surface 88 of the wooden block 42 rests against the ground 41 in the manner illustrated in FIG. 3 whereby the conveying means 33 with its interconnected lure unit 31 is disposed in a free standing position.

The storage bag 32 can then be secured to the chute means 44 by slipping the open end or neck 36 of the bag 32 over the lower end 46 of the chute means 44 and is fastened thereto by the wire tie means 43 to cause the wire tie means 43 to press parts of the bag 32 into the corner notches 82 of the chute means 41 so that the open end 36 of the bag will be held off the ground 41 while the bulk of the bag 32 will be disposed on the ground 41 as illustrated in FIG. 2.

The floral lure device 51 is then slipped into the notch 52 of the upper frusto-conical member 47 and the sex lure device 55 is disposed in the opening 55 of the upper member 47 in the manner illustrated in FIGS. 4 and 5.

Thereafter, the flying insects, namely Japanese beetles, are attracted by the issuing odor of the lure devices 54 and 55 and when the insects reach the funnel-like members 47-49, the attracted insects fall by gravity out through the lower end 56 of the bottom member 49 into the inlet means 34 of the conveying means 33 and fall therein to the downwardly directed platform 71 to roll by gravity into the chute 44 and, thus, into the inlet means 36 of the storage container means 32 to be contained therein until the user disposes of the container means 32 and replaces the same with a new container means in the manner previously described.

However, as previously stated, because of the multiple air breaks 38 disposed between the inlet means 36 of the storage container means 32 and the lure unit 31, the rising decaying odor of the insects trapped within the storage container means 32 will pass out of such air break means 38 to be dissipated in the atmosphere before the same can reach the lure unit 31 to destroy the attracting odors issuing from the lure devices 54 and 55 so that the storage container means 32 need not be emptied as often as the storage container means 24 of the device 20 previously described.

Further, because the storage container means 32 is disposed on the ground 41, the same can hold a relatively large amount of insects in comparison with the storage container means 24 of the prior known device 20 of FIG. 1 which merely has the storage container means 24 suspended from the lure unit 21.

In this manner, the storage container means 32 can comprise a 30 gallon plastic bag and hold more than 250,000 beetles and thereby require attention not more than once every two to four weeks in contrast to the conventional bag capacity of one or two quarts for the prior known device 20 which requires attention sometimes three times daily and can only hold approximately 5,000 beetles.

While the insect trap arrangement 30 of this invention has been previously described as being a free standing arrangement and is the present preferred arrangement of this invention, it is to be understood that the various features of this invention can be utilized to form an insect trap arrangement which is adapted to be suspended from a supporting structure, such as a tree or the like as in the prior known device 20 of FIG. 1.

Figure 11:
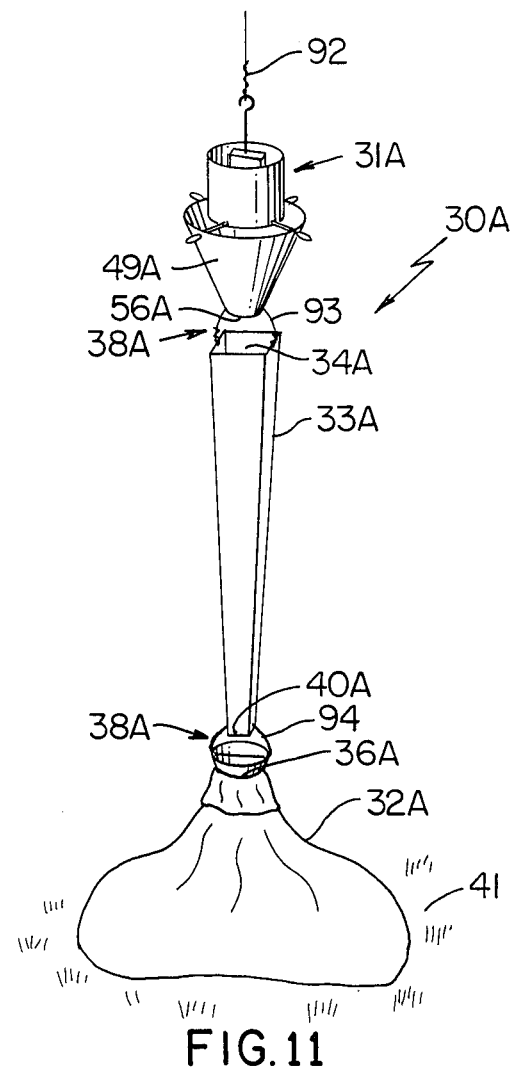
FIG. 11 is a view similar to FIG. 2 and illustrates another embodiment of the insect arrangement of this invention.

For example, reference is now made to FIG. 11 wherein another insect trap arrangement of this invention is generally indicated by the reference numeral 30A and parts thereof similar to the insect trap arrangement 30 previously described are indicated by like reference numerals followed by the reference letter "A".

As illustrated in FIG. 11, the insect trap arrangement 30A includes a lure unit 31A being suspended from a suitable supporting structure, such as a tree, by a wire hanger means 92 and, in turn, suspends the conveying means 33A in spaced relation below the open end 56A of the frusto-conical member 49A by a wire hanger means 93 whereby the upper open end 34A of the conveying means 33A is spaced from the lower open end 56A of the member 49A to define an air break means 38A therewith.

The storage bag or container means 32A is adapted to be supported on the ground 41 and have its upper open end 36A suspended from the lower end 40A of the conveying means 33A by a wire hanger means 94 whereby the inlet means 36A of the storage container means 32A is spaced below the lower open end 40A of the conveying means 33A to define another air break means 38A therewith whereby it can be seen that a plurality of air break means 38A are provided between the inlet means 36A of the storage container means 32A and the lure unit 31A so that the rising odor of the decaying insects within the storage container means 32A can be dissipated into the atmosphere so that the same cannot intermingle with the lure odor issuing from the lure unit 31A for the reasons previously set forth.

Therefore, it can be seen that the insect trap arrangement 30A of FIG. 11 has all of the advantages of the insect trap arrangement 30 previously described while being of the type that is adapted to be suspended from a tree or the like whereas the insect trap arrangement 30 previously described is of the free standing variety.

Nevertheless, it can be seen that each embodiment of the insect trap arrangement of this invention can be merchandised in kit form or can be merchandised in its assembled condition as desired to be used in the manner previously described.

Thus, it can be seen that the resulting insect trap arrangement of this invention comprises a lure unit 31 or 31A for attracting insects thereto and causing the attracted insects to fall by gravity therefrom, an insect storage container means 32 or 32A having an inlet means 36 or 36A for receiving the falling insects therethrough whereby the storage container means 32 or 32A is adapted to store the falling insects therein, and a conveying means 33 or 33A disposed intermediate the lure unit 31 or 31A and the storage container means 32 or 32A and having an inlet means 34 or 34A operatively associated with the lure unit 31 or 31A to receive the falling insects therefrom and having an outlet means 44 or 40A operatively associated with the inlet means 36 or 36A of the storage container means 32 or 32A for discharging by gravity the falling insects from the conveying means 33 or 33A into the inlet means 36 or 36A of the storage container means 32 or 32A. The conveying means 33 or 33A has means 37 or 34A, 40A defining a plurality of spaced apart air break means 38 or 38A between the lure unit 31 or 31A and the inlet means 36 or 36A of the storage container means 32 or 32A to vent the rising odor of the insects in the storage container means 32 or 32A to the atmosphere so that the vented odor will substantially dissipate in the atmosphere before reaching the lure unit 31 or 31A.

Therefore, it can be seen that this invention not only provides an improved insect trap arrangement and method of making the same, but also this invention provides an improved kit for making an insect trap arrangement or the like.

While the forms and methods of this invention now preferred have been illustrated and described as required by the Patent Statute, it is to be understood that other forms and method steps can be utilized and still fall within the scope of the appended claims.

What is claimed is:

1. In an insect trap arrangement comprising a lure unit for attracting insects thereto and causing the attracted insects to fall by gravity therefrom, an insect storage container means having an inlet means for receiving the falling insects therethrough whereby said storage container means is adapted to store said falling insects therein, and a conveying means disposed intermediate said lure unit and said storage container means and having an inlet means operatively associated with said lure unit to receive said falling insects therefrom and having an outlet means operatively associated with said inlet means of said storage container means for discharging by gravity said falling insects from said conveying means into said inlet means of said storage container means, the improvement wherein said conveying means has means defining a plurality of spaced apart air break means between said lure unit and said inlet means of said storage container means to vent the rising odor of the insects in said storage container means to the atmosphere so that the vented odor will substantially dissipate in the atmosphere before reaching said lure unit, said storage container means being disposed on a supporting surface said conveying means having opposed ends one of which is disposed to be supported on said surface means and the other of which supports said lure unit thereon, said conveying means comprising a tubular member having spaced apart openings formed therein intermediate said opposed ends thereof and respectively defining at least some of said air break means, said outlet means of said conveying means comprising a chute means extending laterally outwardly from said tubular member intermediate said opposed ends thereof and having an outer end received in said inlet means of said storage container means.

2. In a kit for making an insect trap arrangement comprising a lure unit for attracting insects thereto and causing the attracted insects to fall by gravity therefrom, an insect storage container means having an inlet means for receiving the falling insects therethrough whereby said storage container means is adapted to store said falling insects therein, and a conveying means for being disposed intermediate said lure unit and said storage container means and having means for defining an inlet means for being operatively associated with said lure unit to receive said falling insects therefrom and having means for defining an outlet means for being operatively associated with said inlet means of said storage container means for discharging by gravity said falling insects from said conveying means into said inlet means of said storage container means, the improvement wherein said conveying means has means for defining a plurality of spaced apart air break means between said lure unit and said inlet means of said storage container means to vent the rising odor of the insects in said storage container means to the atmosphere so that the vented odor will substantially dissipate in the atmosphere before reaching said lure unit, said storage container means comprising a bag having the open end thereof for defining said inlet means thereof, said conveying means comprising a blank of material having means to form said blank of material into a tubular member having opposed open ends one of which is adapted to define said inlet means thereof, and including a chute means to extend laterally outwardly from the resulting tubular member intermediate said opposed ends thereof and having an outer end for being received in said inlet means of said storage container means.

3. A kit for making an insect trap arrangement as set forth in claim 2 wherein said chute means has means for forming an opening in said chute means to define one of said air break means intermediate the resulting tubular member and said inlet means of said storage container means.

4. In a method of making an insect trap arrangement comprising the steps of forming a lure unit for attracting insects thereto and causing the attracted insects to fall by gravity therefrom, providing an insect storage container means having an inlet means for receiving the falling insects therethrough whereby said storage container means is adapted to store said falling insects therein, forming a conveying means, disposing said conveying means intermediate said lure unit and said storage container means, operatively associating an inlet means of said conveying means with said lure unit to receive said falling insects therefrom, and operatively associating an outlet means of said storage container means with said inlet means of said storage container means for discharging by gravity said falling insects from said conveying means into said inlet means of said storage container means, the improvement comprising the steps of forming a plurality of spaced apart air break means between said lure unit and said inlet means of said storage container means to vent the rising odor of the insects in said storage container means to the atmosphere so that the vented door will substantially dissipate in the atmosphere before reaching said lure unit, disposing said storage container means on the ground or the like to thereby support said storage container means, forming said conveying means to comprise a tubular member having opposed ends, disposing one of said ends to be supported on the ground or the like, supporting said lure unit on the other of said ends of said tubular member, forming a plurality of spaced apart openings in said tubular member intermediate said opposed ends thereof to respectively define at least some of said air break means, forming a chute means, attaching said chute means to said tubular member intermediate the opposed ends thereof so as to extend laterally outwardly therefrom and define said outlet means of said conveying means, and disposing an outer end of said chute means in said inlet means of said storage container means.

* * * * *